US009794229B2

(12) United States Patent
Yu et al.

(10) Patent No.: US 9,794,229 B2
(45) Date of Patent: *Oct. 17, 2017

(54) BEHAVIOR ANALYSIS BASED DNS TUNNELING DETECTION AND CLASSIFICATION FRAMEWORK FOR NETWORK SECURITY

(71) Applicant: Infoblox Inc., Santa Clara, CA (US)

(72) Inventors: Bin Yu, Pleasanton, CA (US); Les Smith, Pleasanton, CA (US); Mark Threefoot, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,822

(22) Filed: Sep. 30, 2015

(65) Prior Publication Data

US 2016/0294773 A1    Oct. 6, 2016

Related U.S. Application Data

(60) Provisional application No. 62/142,846, filed on Apr. 3, 2015, provisional application No. 62/205,385, filed on Aug. 14, 2015.

(51) Int. Cl.
*H04L 29/06* (2006.01)

(52) U.S. Cl.
CPC ........ *H04L 63/029* (2013.01); *H04L 63/1425* (2013.01); *H04L 63/1441* (2013.01)

(58) Field of Classification Search
CPC ..... H04L 63/00; H04L 63/02; H04L 63/0263; H04L 63/029; H04L 63/14; H04L 63/1408; H04L 63/1425; H04L 63/1441; H04L 63/1466; H04L 63/20; H04L 63/205

See application file for complete search history.

(56) References Cited

U.S. PATENT DOCUMENTS

| | | | |
|---|---|---|---|
| 7,426,576 B1 | 9/2008 | Banga et al. | |
| 7,970,878 B1 * | 6/2011 | Burshan | H04L 63/0236 370/255 |
| 9,178,876 B1 * | 11/2015 | Johansson | H04L 9/085 |
| 2006/0031928 A1 * | 2/2006 | Conley | H04L 63/0236 726/11 |
| 2007/0261112 A1 | 11/2007 | Todd et al. | |
| 2009/0158430 A1 * | 6/2009 | Borders | G06F 21/552 726/23 |
| 2011/0311140 A1 * | 12/2011 | Urbach | G06K 9/00664 382/182 |

(Continued)

OTHER PUBLICATIONS

Ellens et al., Flow-Based Detection of DNS Tunnels, IFIP International Federation for Information Processing, AIMS 2013, LNCS 7943, pp. 124-135, 2013.

(Continued)

*Primary Examiner* — Eric W Shepperd
(74) *Attorney, Agent, or Firm* — Van Pelt, Yi & James LLP

(57) ABSTRACT

New and improved techniques for a behavior analysis based DNS tunneling detection and classification framework for network security are disclosed. In some embodiments, a platform implementing an analytics framework for DNS security is provided for facilitating DNS tunneling detection. For example, an online platform can implement an analytics framework for DNS security based on passive DNS traffic analysis.

20 Claims, 11 Drawing Sheets

(56) References Cited

U.S. PATENT DOCUMENTS

| | | | |
|---|---|---|---|
| 2012/0054860 A1* | 3/2012 | Wyschogrod | H04L 29/12066 726/22 |
| 2012/0254333 A1* | 10/2012 | Chandramouli | G06F 17/27 709/206 |
| 2013/0283337 A1* | 10/2013 | Schechter | G06F 21/46 726/1 |
| 2014/0307551 A1 | 10/2014 | Forssell | |
| 2014/0310808 A1* | 10/2014 | Yao | G06F 21/316 726/22 |
| 2014/0344345 A1 | 11/2014 | Venkatraman et al. | |
| 2016/0026796 A1* | 1/2016 | Monrose | G06F 21/562 726/24 |
| 2016/0065611 A1* | 3/2016 | Fakeri-Tabrizi | H04L 63/1425 726/23 |
| 2016/0099852 A1* | 4/2016 | Cook | H04L 47/2425 709/224 |
| 2016/0127395 A1* | 5/2016 | Underwood | H04L 63/1416 726/23 |

OTHER PUBLICATIONS

Born et al., Detecting DNS Tunnels Using Character Frequency Analysis, 2010.
Dusi et al., A Preliminary Look at the Privacy of SSH Tunnels, 17th IEEE International Conference on Computer Communication and Networks (ICCCN'08), U.S. Virgin Islands, Aug. 3-7, 2008.
Author Unknown, Alexa—The Web Information Company, Analytics for any Website, downloaded from http://www.alexa.com/ on Jan. 28, 2014.
Antonakakis et al., Detecting Malware Domains at the Upper DNS Hierarchy, downloaded on Jan. 27, 2014.
Antonakakis et al., Building a Dynamic Reputation System for DNS, downloaded on Jan. 27, 2014.
Bilge et al., Exposure: Finding Malicious Domains Using Passive DNS Analysis, downloaded on Jan. 27, 2014.
Author Unknown, Internet Systems Consortium, Maintainers of BIND and ISC DHCP, downloaded from http://www.isc.org/ on Jan. 28, 2014.
Author Unknown, Catching DNS Tunnels with IDS that doesn't suck A.I, downloaded on Sep. 28, 2015.
Greg Farnham et al., Detecting DNS Tunneling, SANS Institute InfoSec Reading Room, accepted on Feb. 25, 2013.
Author Unknown, FSI, downloaded from https://www.farsightsecurity.com/ on Jan. 28, 2014.
Chang et al., Bigtable: A Distributed Storage System for Structured Data, OSDI, 2006.
Author Unknown, Google Books, Ngram Viewer, downloaded from http://storage.googleapis.com/books/ngrams/books/datasetsv2.html on Sep. 22, 2015.
Author Unknown, Welcome to Apache Hadoop, What is Apache Hadoop?, downloaded from http://hadoop.apache.org/ on Jan. 28, 2014.
Author Unknown, HBase—Apache HBase Home, downloaded from http://hbase.apache.org/ on Jan. 28, 2014.
P.Vixie, Network Working Group, ISC, Extension Mechanisms for DNS (EDNSO), Aug. 1999.
Hu et al., RB-Seeker: Auto-detection of Redirection Botnets, downloaded on Jan. 27, 2014.
Author Unknown, Apache Kafka, A High-Throughput Distributed Messaging System, downloaded from https://kafka.apache.org/ on Jan. 28, 2014.
Konte et al., Dynamics of Online Scam Hosting Infrastructure, downloaded on Jan. 27, 2014.
Author Unknown, Kyro.se: Iodine, Jun. 16, 2014.
Borders et al., Web Tap: Detecting Covert Web Traffic, CCS'04, Washington, DC, USA, ACM, Oct. 25-29, 2004.
Yu et al., Semi-Supervised Time Series Modeling for Real-Time Flux Domain Detection on Passive DNS Traffic, MLDM 2014, LNAI 8556, pp. 258-271, 2014.
C.E. Shannon, A Mathematical Theory of Communication, Reprinted with Correction from The Bell System Technical Journal, vol. 27, Jul. and Oct. 1948.
Author Unknown, Storm, downloaded from http://storm-project.net/ on Jan. 28, 2014.
Crotti et al., Detecting HTTP Tunnels with Statistical Mechanisms, 2007.
Dusi et al., Detection of Encrypted Tunnels Across Network Boundaries, IEEE, 2008.
Author Unknown, Internet Systems Consortium, Maintainers of BIND and ISC DHCP, downloaded from http://www.isc.org/ on Sep. 22, 2015.
Dr. Jim Metzler, The 2012 Cloud Networking Report, Dec. 2012.

* cited by examiner

BEHAVIOR ANALYSIS BASED DNS TUNNELING DETECTION AND CLASSIFICATION FRAMEWORK FOR NETWORK SECURITY

CROSS REFERENCE TO OTHER APPLICATIONS

This application claims priority to U.S. Provisional Patent Application No. 62/142,846 entitled BEHAVIOR ANALYSIS BASED DNS TUNNELING DETECTION AND CLASSIFICATION FRAMEWORK FOR NETWORK SECURITY filed Apr. 3, 2015 which is incorporated herein by reference for all purposes, and this application claims priority to U.S. Provisional Patent Application No. 62/205,385 entitled BEHAVIOR ANALYSIS BASED DNS TUNNELING DETECTION AND CLASSIFICATION FRAMEWORK FOR NETWORK SECURITY filed Aug. 14, 2015.

BACKGROUND OF THE INVENTION

Domain Name System (DNS) network services are generally ubiquitous in IP-based networks. DNS tunneling is an approach used to convey messages through TCP tunnels over DNS protocol that is typically not blocked or monitored by security enforcement, such as firewalls.

As such, DNS tunneling can be utilized in many malicious ways that can compromise the security of a network. For example, DNS tunneling can be used for various malicious/unauthorized activities, such as data exfiltration, cyber-espionage, and/or command and control.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 3:
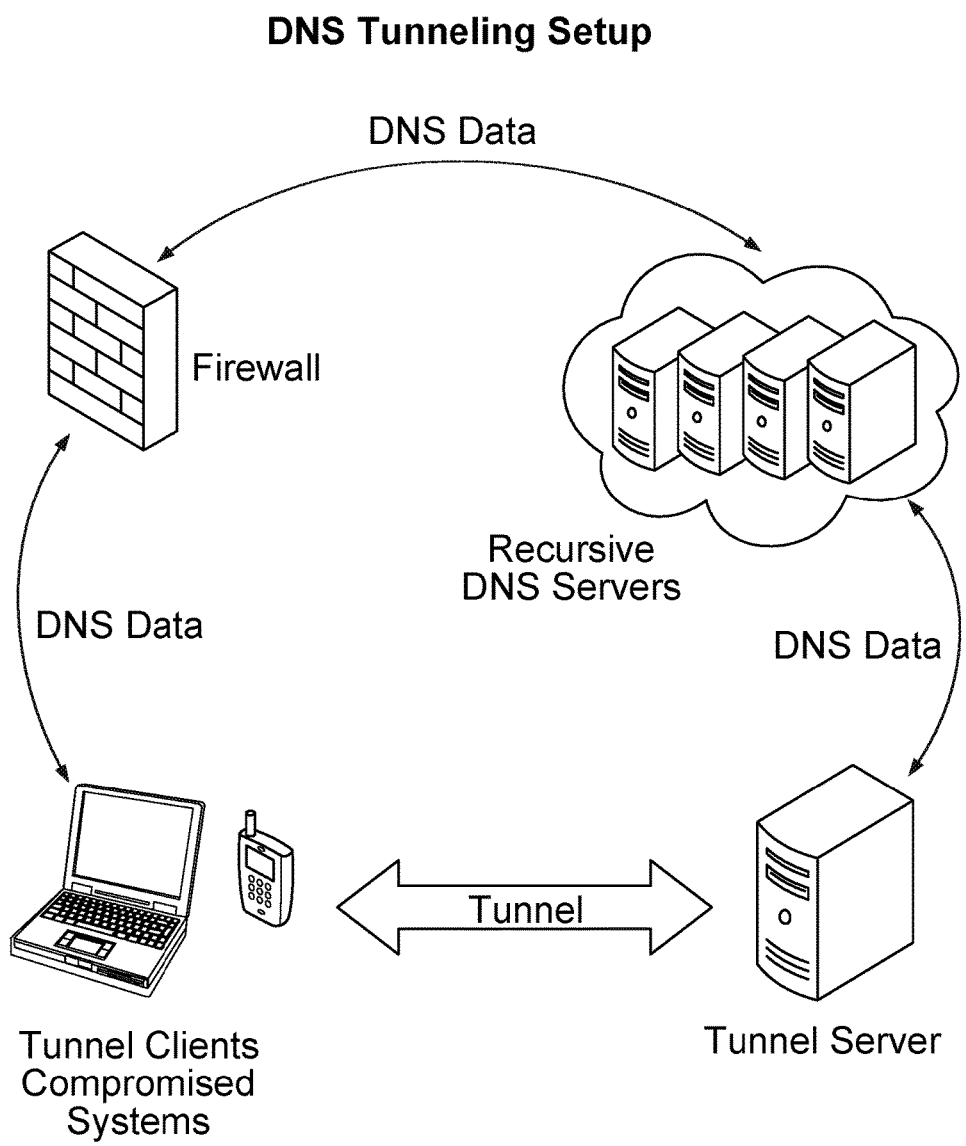
FIG. 3 illustrates an example of a DNS tunneling setup.

Domain Name System (DNS) network services are generally ubiquitous in IP-based networks. DNS tunneling is an approach used to convey messages through TCP tunnels over DNS protocol that is typically not blocked or monitored by security enforcement, such as firewalls. FIG. 3 illustrates an example of a DNS tunneling setup. DNS tunneling generally works by encapsulating data into DNS packets. Typically, the tunnel client encapsulates the data to be sent in a query for a specific domain name. The DNS resolver treats the tunnel traffic as a regular request by starting the look-up process for the requested domain name, possibly recursively consulting other DNS resolvers, as shown in FIG. 3. At the end of this operation, the request is processed by the tunnel server. The server retrieves the encapsulated data and responds to DNS queries by enclosing tunnel data in the answer section of the DNS response message.

Although most DNS tunneling techniques typically use 'TXT' type queries in DNS that can maximize the payload in response packets, there are implementations that make use of DNS query types other than 'TXT' such as 'A', 'AAAA', 'CNAME', 'NS', 'MX' and so on.

DNS tunneling poses a significant threat and there are methods to detect it. DNS tunnels can be detected by analyzing a single DNS payload based on its fundament that the tunnel is used to convey information. However, as a simple technique, DNS tunnels are often used by legitimate users to transfer short messages such as heartbeats. Single payload-based methods have less latency in detection but cannot make an accurate classification between legitimate and malicious activities.

As such, DNS tunneling can be utilized in many malicious ways that can compromise the security of a network. For example, DNS tunneling can be used for various malicious/unauthorized activities, such as data exfiltration, cyber-espionage, and/or command and control (C&C).

DNS tunneling can also be used by legitimate users for authorized/legitimate purposes. However, existing approaches for detecting DNS tunneling are not able to effectively and efficiently distinguish between legitimate and malicious uses even if they can detect the DNS tunneling activities.

Accordingly, new and improved techniques for detecting DNS tunneling (e.g., for detecting malicious DNS tunneling activities) are disclosed. In some embodiments, a behavior analysis based DNS tunneling detection and classification framework for network security (e.g., using one or more DNS tunneling classifiers, such as further described below) is disclosed. For example, the disclosed behavior-based techniques can detect the DNS tunneling and can also classify the activities in order to identify unauthorized/malicious network traffic using DNS tunneling. An example implementation of the behavior analysis based DNS tunneling detection and classification framework for network security can achieve the scale of real-time detection on fast and large sets of DNS data with the use of big data technologies in online and offline systems, such as further described below.

Another DNS security threat is associated with flux domains. Flux domain, also referred to as fast flux and domain flux, is often used as an evasion technique that cyber-criminals and Internet miscreants use to evade identification and to frustrate law enforcement and anti-cyber-crime efforts aimed at locating and shutting down web sites used for illegal or other improper or unauthorized purposes. Flux domain is generally an advanced persistent threat that is an active threat vector. In addition, flux domain behaviors are continually changing and evolving in an attempt to evade existing detection measures (e.g., existing signature-based approaches and/or existing flux domain detection techniques).

Accordingly, in some embodiments, the online platform implementing an analytics framework for DNS security (e.g., using one or more flux domain classifiers, such as further described below) can detect and classify DNS tunneling and/or can also detect and classify a flux domain. Techniques disclosed herein provide a new and more robust solution to DNS security with advanced analytics and/or machine learning techniques that can facilitate zero-day detection of flux domains.

For example, an online platform can implement an analytics framework for DNS security based on DNS traffic analysis (e.g., analysis of passive DNS traffic can be performed to detect and classify DNS tunneling based on one or more features using one or more DNS tunneling classifiers) as further described herein with respect to various embodiments. In particular, the online platform can be implemented to support large throughput with real-time DNS streaming data processing with advanced analytics techniques.

In some embodiments, an online platform implementing an analytics framework for DNS security based on passive DNS traffic analysis includes receiving a DNS data stream; processing the DNS data stream to identify DNS tunneling activity (e.g., DNS tunneling behavior) based on a behavioral analysis model (e.g., classifier) applied to a time series collection of passive DNS traffic data; and performing a mitigation action based on the identified DNS tunneling activity (e.g., a bad/malware network domain/FQDN and/or malware IP associated with the suspicious/malicious DNS tunneling activity can be identified and added to a blacklist/policy, which can be communicated/distributed such as using an RPZ feed or another communication mechanism). For example, the bad network domain can be determined to be associated with a DNS tunneling activity and/or a flux domain. In an example implementation, the DNS data stream can include DNS query and DNS response data.

For example, the disclosed techniques can facilitate detecting DNS tunneling transactions. As another example, the disclosed techniques can facilitate stopping (e.g., blocking or preventing) DNS tunneling transactions. As yet another example, the disclosed techniques can include providing a reputation service based on detecting bad/malware domain names and/or bad/malware IP addresses associated with such detected DNS tunneling transactions.

In one embodiment, the online platform implementing an analytics framework for DNS security based on passive DNS traffic further includes determining a host is infected based on detecting a DNS query request to the bad network domain. In one embodiment, the online platform implementing an analytics framework for DNS security based on passive DNS traffic further includes performing a mitigation action based on the determined infected host. For example, the mitigation action (e.g., in response to a suspicious/malicious DNS tunneling activity detection and/or flux domain detection) can include one or more of the following: generating a firewall rule based on the bad network domain; configuring a network device to block network communications with the bad network domain; and quarantining an infected host, in which the infected host is determined to be infected based on an association with the bad network domain (e.g., the infected host submitted a DNS query for the bad network domain). In some implementations, the mitigation action can include configuring a network device (e.g., a switch or router, implemented as a physical or virtual switch/router) to quarantine the infected host and/or block access to the bad network domain, using network access control or other mechanisms to quarantine the infected host and/or block access to the bad network domain, configuring a security device controller using Open Flow or other Software Defined Networking (SDN) techniques to configure a network device (e.g., a switch or router, implemented as a physical or virtual switch/router) to quarantine the infected host and/or block access to the bad network domain, and/or to implement other configuration/programming techniques such as via API or publish/subscribe mechanisms to configure a network device (e.g., a switch or router, implemented as a physical or virtual switch/router) to quarantine the infected host and/or block access to the bad network domain.

In one embodiment, the online platform implementing an analytics framework for DNS security further includes identifying a source IP address, a source host, or attempting to query the bad network domain and/or bad IP address.

In one embodiment the online platform implementing an analytics framework for DNS security further includes storing the time series collection of passive DNS traffic data in a data store (e.g., an observation cache).

In one embodiment, the online platform implementing an analytics framework for DNS security further includes receiving DNS data that is collected from an agent executed on a DNS appliance. For example, the agent can be configured to collect DNS data on the DNS appliance and to send the DNS data as a DNS data stream to the online platform implementing an analytics framework for DNS tunneling detection and/or flux domain detection based on passive DNS traffic. In an example implementation, the DNS data can be collected at one or more DNS appliances and sent to a real-time processor cluster of the online platform that can determine the bad network domain based on applying one or more behavioral models based on one or more features extracted from the passive DNS data traffic.

In one embodiment, the online platform implementing an analytics framework for DNS security further includes extracting a plurality of features from the DNS data stream to detect and classify DNS tunneling based on one or more of the extracted features. In one embodiment, the online platform implementing an analytics framework for DNS security further includes applying a behavioral model based on extracted DNS data features to detect and classify DNS tunneling activity (e.g., detecting DNS tunneling behavior based on the extracted DNS data features using one or more classifiers, such as further described below).

In one embodiment, the online platform implementing an analytics framework for DNS security further includes extracting a plurality of features from the DNS data stream to determine whether a network domain is associated with a flux domain (e.g., a fast flux domain) based on one or more of the extracted features. For example, one or more models based on DNS data feature extraction can be applied to determine whether a network domain is associated with a legitimate flux domain (e.g., Content Delivery Network (CDN), Network Time Protocol (NTP), or Internet Relay Chat (IRC) services) and is not a suspicious or malicious flux domain.

In one embodiment, the online platform implementing an analytics framework for DNS security further includes applying a behavioral model based on extracted DNS data features to detect illegitimate flux domains (e.g., as opposed to using a simple blacklist comparison).

In some implementations, a feedback loop can be used to improve DNS tunneling activity detection and/or flux domain detection (e.g., by automatically adjusting thresholds for correlations, such as based on user feedback, analysis of additional processed DNS data, and/or improved training of the behavioral models, such as improved training performed using an offline platform as further discussed herein).

In one embodiment, the online platform implementing an analytics framework for DNS security further includes processing the DNS data stream using a real-time processor cluster. For example, the real-time processor cluster can implement one or more DNS-based behavioral models, such as an n-feature model (e.g., an example five-feature model as further described herein, or another number of extracted features can be implemented using a similar or different behavior model) for flux domain detection. As another example, the real-time processor cluster can implement one or more DNS-based behavioral models, such as an n-feature model (e.g., an example model utilizes entropy, lexical, n-gram, and time series features as further described herein, or additional/different extracted features can be implemented using a similar or different behavior model) for DNS tunneling detection.

In an example implementation, the real-time processor cluster is in communication with an observation cache (e.g., for storing time series data of a DNS data stream, including DNS data and meta-data that can be extracted or calculated for the DNS data, and the observation cache can be implemented as a persistent, scalable cache). In some cases, the bad network domain detection results from the real-time processor cluster can be provided to a detection data store (e.g., a detection database) and/or to a mitigation engine for performing responsive actions (e.g., mitigation engine determined and requested actions).

For example, the online platform can be implemented using an appliance for DNS security on a network (e.g., deployed on an enterprise network for network security). As another example, the online platform can be implemented in software for providing DNS security on a network executed on a computing device (e.g., an appliance, a server, a gateway, or another computing device, which can be deployed on an enterprise network for network security).

In one embodiment, the online platform implementing an analytics framework for DNS security includes an online framework that can apply one or more models (e.g., behavior models) for detecting known and/or unknown malicious DNS queries or anomalies in a real-time stream of DNS data. As a DNS request is generally a first step for most network communications, these techniques can be implemented using the online platform to accurately identify malicious DNS query patterns and then effectively detect and block such network communication attempts between a compromised host(s) and, for example, botnets or command and controls.

In one embodiment, the online platform implementing an analytics framework for DNS security includes applying a time series model based on a set of features by applying a set of prominent features that can be applied to a behavior-based model for detecting DNS security problems, such as DNS tunneling activities and/or flux domains. Given that the amount of network data can be very large and flows in a fast speed, a horizontally scalable online system can be provided to facilitate large data throughput in near real-time as further described herein with respect to various embodiments.

In one embodiment, models for detecting known and/or unknown malicious DNS queries or anomalies (e.g., models that can be implemented and applied using an online platform) can be generated and trained offline using an offline platform as further described herein with respect to various embodiments. In an example implementation, a semi-supervised training framework for an offline platform can be provided to overcome the difficulties common in traditional supervised machine learning for DNS/network securities as further described herein with respect to various embodiments.

These and various other examples for applying techniques for an online platform implementing an analytics framework for DNS security are discussed below with respect to various embodiments.

Figure 1:
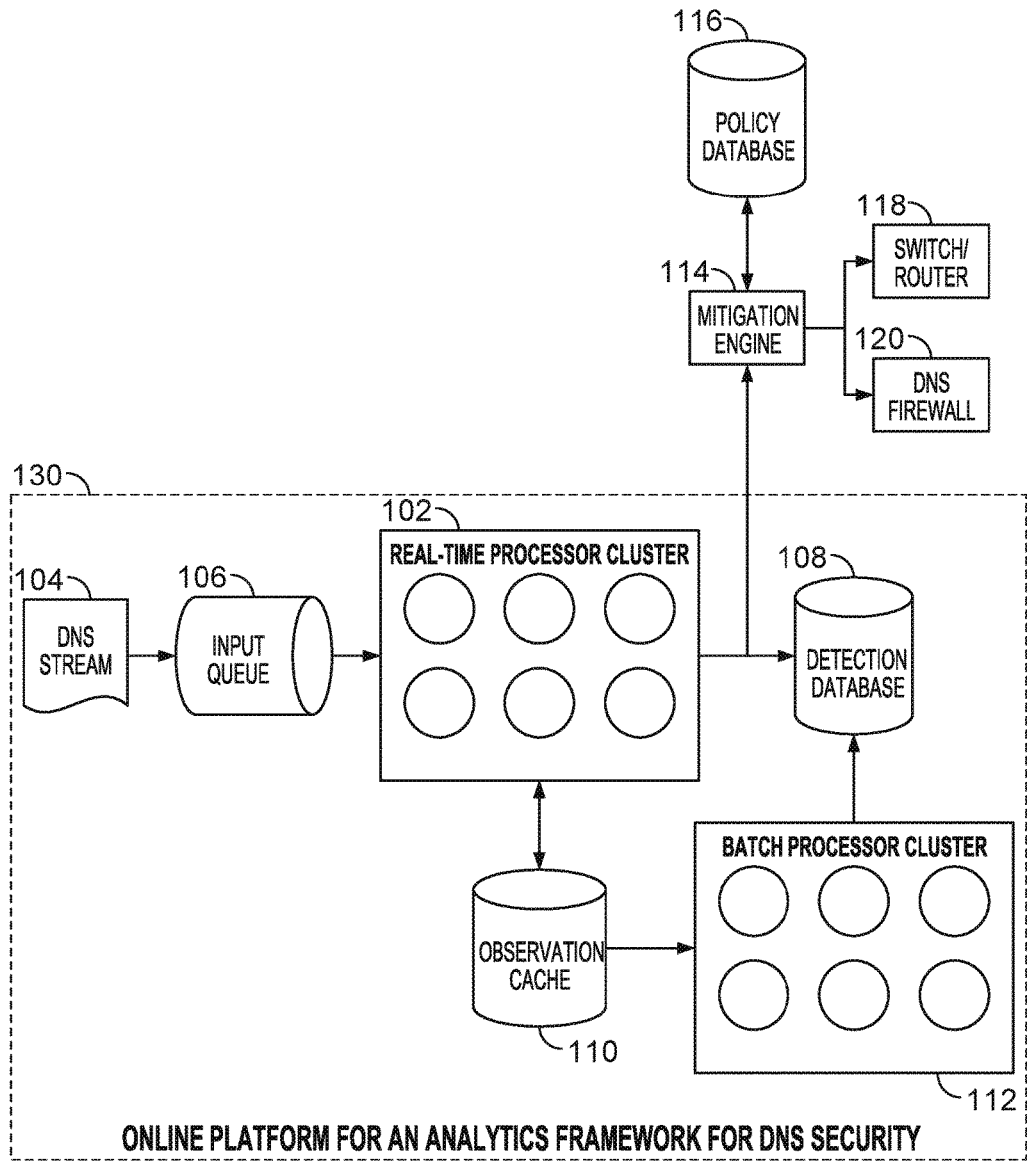
FIG. 1 is a functional block diagram illustrating an architecture for providing an online platform implementing a behavior analysis based DNS tunneling detection and classification framework for network security in accordance with some embodiments.

Online Platform Architecture for Implementing an Analytics Framework for DNS Security FIG. 1 is a functional block diagram illustrating an architecture for providing an online platform implementing a behavior analysis based DNS tunneling detection and classification framework for network security in accordance with some embodiments. In one embodiment, the framework for an online platform includes a real-time processor cluster and, in some implementations, can optionally include a batch processor cluster (e.g., both of which can be scalable implementations). For example, the real-time processor cluster can be configured to handle Complex Event Processing (CEP) functions that process and analyze DNS stream data input, conduct real-time DNS stream data detection, extract features, and send raw and metadata into an observation cache. In complement to the real-time detection that may be bound by system resources, a batch processor cluster can optionally be provided to perform detection in a preset schedule against DNS data stored in the observation cache in a manner that can be cost effective. In an example implementation, the detection modules can be pluggable that are trained from an offline platform (e.g., an offline forensic platform), such as described further with respect to FIG. 2. In particular, the online platform can apply various models for DNS tunneling activity detection and/or flux domain detection as further described herein. In addition, these models can be retrained and refined in the online system as further described herein.

Referring to FIG. 1, the online platform includes a real-time processor cluster 102 that receives a DNS data stream 104 via an input queue 106. For example, to detect DNS tunneling activity detection and/or flux domains in real-time, a horizontally scalable infrastructure that can facilitate real-time end-to-end processing can be provided. The time series model, as further discussed below, also can be implemented using a large and fast observation cache that can perform at web scale and at DNS speed. In one example implementation of the architecture of the online platform shown in FIG. 1, the architecture is composed of various open source components that are distributed and horizontally scalable as further discussed below.

In an example implementation, an agent can be configured to execute on one or more DNS servers or appliances to collect and periodically or in real-time send DNS queries to DNS stream 104, which is then provided in a queuing mechanism to collect and near real-time process that DNS data using the real-time process cluster. For example, the agent can be configured to send over a DNS stream as structured data using input queue 106 as shown in FIG. 1. In some cases, the DNS data streams can be partitioned per grid, such as for security and/or for policy/rules separation (e.g., mitigations can be configured per grid based on a per grid policy or some other level of granularity). Input queue 106 can be implemented using an open source message queue, such as the Apache Kafka high-throughput distributed messaging system that can be used as a persistent queue for input of the DNS message stream.

In one embodiment, real-time processor cluster 102 performs automated detection analysis for DNS security based on passive DNS traffic analysis using various techniques as described herein and provides DNS security detection results to a detection database 108 (e.g., and in some implementations, this activity is also performed by batch processor cluster 112, such as shown in FIG. 1). In an example implementation, real-time processor cluster 102 can be implemented using an open source platform for stream data processing, such as Apache Storm or Apache Spark which is a free and open source distributed real-time computation system (e.g., a distributed framework that allows applications to run in parallel, in which users can build topology networks in the application layer based on its API, in which each topology that is distributed and managed by the Storm network is for one or more applications) that can be implemented to perform real-time analytics based on models and various machine learning techniques as further described herein. In particular, real-time processor cluster 102 performs DNS security feature detection analysis (e.g., IP address changing over time, and/or other features, using caching techniques to calculate those features using a time series collection of DNS data).

In some implementations, an observation cache 110 is also provided that is in communication with real-time processor cluster 102, which can be used to provide a time series set of DNS data for applying models (e.g., classifiers) that utilize feature extraction techniques that involve using time series sets of DNS data. For example, time series data can be stored in observation cache 110, such as DNS data and meta-data that includes features extracted or calculated from DNS queries. The observation cache can be implemented as a persistent, scalable, parallel computing cache (e.g., for storing time series data so that IP changes over time for a particular network domain can be detected, and/or for observing various other features associated with the time series collection of DNS data). In an example implementation, the observation cache can be implemented using an open source cache solution, such as the Memcached high-performance, distributed memory object caching system or HBase which is a persistent key-value store that has very fast insertion speed and built-in TTL and versioning features that can be used by the observation cache, and this can also be used for storing detection results for mitigation and reporting. Also, an optional batch processor cluster, shown as batch processor cluster 112, can be used for analysis of such time series data. In some implementations, real-time processor cluster 102 can be used for analysis of such time series data, and a batch processor cluster is not needed in such implementations.

As shown in FIG. 1, an incoming stream is processed in real-time with an Apache Storm or Apache Spark framework and inserted into the observation cache along with the extracted features that are indexed by, for example, requester IP address and second level domain (SLD). The observation cache can include an in-memory layer and an on-disk layer of which the use is dependent on the data size. The detection can be triggered by event or scheduled by interval to be cost effective.

This online detection framework can be implemented as an appliance (e.g., or using a set of appliances and/or computing servers or other types of computing devices). For example, the portion of the online platform as indicated by reference numeral 130 can be implemented on one or more computer servers or appliance devices or can be implemented as a cloud service, such as using Amazon Web Services or another cloud service provider for cloud-based computing and storage services.

As also shown in FIG. 1, DNS security detection results determined using the online platform 130 can also be communicated to a mitigation engine 114. In some implementations, the mitigation engine can be implemented within or integrated with the online platform. Mitigation engine 114 can determine and request various mitigation actions in response to the DNS security detection results based on a policy, such as a DNS security policy stored in a policy database 116. For example, mitigation engine 114 can configure a switch or router networking device 118 to filter (e.g., block or blacklist) a DNS query/request that was determined to be associated with a bad network domain (e.g., domain name/FQDN) and/or a bad IP address using real-time processor cluster 102. As another example, mitigation engine 114 can communicate with a DNS firewall 120 to identify one or more determined bad domains that were determined to be associated with a bad network domain (e.g., domain name/FQDN) and/or a bad IP address using real-time processor cluster 102. In some implementations, mitigation engine 114 communicates with a DNS firewall (e.g., or other firewall device) 120 using a data feed, such as a Response Policy Zone (RPZ) data feed, via a publish/subscribe connection protocol, and/or various other communication mechanisms.

As an example use case scenario, assume that a new network domain is received in the DNS stream, such as XYZ.com (e.g., the new network domain can be specified in the form of an FQDN or an SLD). The first time that the XYZ.com domain is received by the processor cluster, that network domain can be cached in the observation cache (e.g., the network domain can be cached along with its resolved IP address). This particular XYZ.com domain can be received up to a threshold number of times (e.g., 100 times, 1,000 times, or some other threshold number of times) with different IP addresses associated with that same XYZ.com domain up to a threshold period of time (e.g., one hour, one day, one week, or some other threshold period of time). When a given domain's time series is classified to be malicious at any time during this caching process, then the XYZ.com domain is flagged and stored in the detection database (e.g., in this example, the XYZ.com can be identified as associated with illegitimate DNS tunneling activities and/or an illegitimate flux domain based on these and/or additional parameters observed during this time period of such captured DNS data). In some cases, whitelists and/or blacklists can be used to eliminate processing for network domains in the DNS data that have previously been determined to be good or bad. If bad network domains (e.g., bad domains) are detected, such as XYZ.com that was determined to be a bad domain in this example, the detection database can then communicate with the mitigation engine, which can be in communication with a policy data store (e.g., policies can be configured by/for an enterprise, by grid, and/or other policy configurations by grid, network, customer/entity, and/or other configurations and scope of applicability of rules configured in such policies). The mitigation engine can be configured based on the policy to perform various actions, such as the following: (1) add the XYZ.com domain to a blacklist, as the XYZ.com domain was determined to be a bad network domain in this example, and can also provide a feed back to the processor cluster and/or a DNS security service (e.g., a cloud-based DNS security service); (2) send the XYZ.com domain to a networking device, such as a router and/or a switch (e.g., physical or soft/virtual networking devices), which can then quarantine the host that was the source of the DNS query request for the XYZ.com domain, which was determined to be a bad network domain in this example; (3) send the XYZ.com domain to a DNS firewall or other firewall (e.g., via response policy zone (RPZ) data feed to the DNS firewall, via a connector model or publish/subscribe communication protocol/model, and/or using another communication mechanism). The above-described responses performed using the mitigation engine can be implemented to block the network traffic to the XYZ.com domain, which was determined to be a bad network domain in this example, and/or to quarantine the host that is attempting to communicate with this bad network domain (e.g., the host can be deemed to be infected, such as by a botnet and/or other malware, by the fact that the host attempted to communicate with the XYZ.com domain, which was determined to be a bad domain), or to automatically reconfigure routers and/or switches to automatically configure these network devices (e.g., using NETMRI, a security device controller using OpenFlow, or another mechanism that can perform such automated network device configurations) to quarantine the host source for the bad network domain. In some cases a benign classifier (e.g. generated by a research analyst to eliminate or reduce false positives) can be used to pre-process DNS stream data to determine whether a received DNS query in the DNS data stream is a valid DNS query so that it can be determined that there is no need to further process that DNS query using the online platform, such as for DNS queries for domains that are known to be associated with a CDN, NTP, or IRC service, or an enterprise host on the enterprise's network.

In one embodiment, an online platform implementing a behavior analysis based DNS tunneling detection and classification framework for network security includes applying one or more models for DNS tunneling activity detection and classification. In an example embodiment, the online platform implements an analytics framework for DNS tunneling detection by implementing one or more DNS-based behavioral models, such as an n-feature model that extracts and analyzes prominent features that can be associated with DNS tunneling activities (e.g., an example model utilizes entropy, lexical, n-gram, and time series features as further described herein, or additional/different extracted features can be implemented using a similar or different model) for DNS tunneling activity detection, such as further described below. For example, a semi-supervised training framework can be provided to overcome the difficulties common in traditional supervised machine learning for network security, such as further described below. Given that the amount of network data can be very large and flows in a fast speed, a horizontally scalable online system, such as the online platform described above with respect to FIG. 1, can be provided to facilitate large data throughput in near real-time as described herein with respect to various embodiments.

In one embodiment, an online platform implementing a behavior analysis based DNS tunneling detection and classification framework for network security also includes applying one or more models for flux domain detection. In an example embodiment, the online platform implements an analytics framework for flux domain detection based on passive DNS traffic analysis that can apply a time series model based on a set of features by applying a set of prominent features that can address behavior changes in domain flux. For example, a semi-supervised training framework can be provided to overcome the difficulties common in traditional supervised machine learning for network security. Given that the amount of network data can be very large and flows in a fast speed, a horizontally scalable online system, such as the online platform described above with respect to FIG. 1, can be provided to facilitate large data throughput in near real-time as described herein with respect to various embodiments.

In one embodiment, an architecture for an online platform implementing a behavior analysis based DNS tunneling detection and classification framework for network security is disclosed that supports multiple classifiers for performing DNS security. For example, common attributes can be efficiently extracted from a DNS data stream for using by two or more different classifiers for performing DNS security. Example classifiers include classifiers for domain flux (fast flux) related activities, classifiers for DNS tunneling related activities, classifiers for domain generation algorithm (DGA) related activities, and/or other classifiers for performing DNS security. Example classifiers for DNS tunneling and domain flux related activities will now be further described below.

Example DNS Tunneling Classification Models—Feature Extraction and Selection

In one embodiment, a time series model based on a set of features by applying a set of prominent features that can facilitate detection of DNS tunneling activities is applied (e.g., feature extraction and selection techniques as further described below), such as using the online platform discussed above. Specifically, the proposed detection mechanism is based on extraction of DNS data (e.g., features) from a DNS data stream (e.g., a series of DNS messages), as further discussed below.

The legitimate DNS traffic typically has very small payload. Generally, that is a reason that many approaches detect tunnels based on payload size. However, when space and bandwidth get less expensive, more and more legitimate users are using longer domain names. Because a primary objective of the tunneling technique is to convey information via the tunnel in a way as efficient as possible, the entropy metrics can be extracted as a feature for detecting such DNS tunneling activities. On the other side, human readability of domain names can also be extracted as an indicator in tunnel detection.

Effective Payload

There are many types of DNS queries. A tunnel will use a query name to carry outbound payloads. The inbound payloads are carried in many different ways depending on the DNS resource record type. For example, in TXT type, the payload is encoded in the text. For many other types, such as A, AAAA, or CNAME, the payload is carried in one or more FQDNs. Unlike legitimate DNS queries that have consistency in query and response, a malicious tunnel tends to change the payload from message to message. An effective payload is a string that is extracted from its original with common prefix, suffix, and aligned middle segments removed so that the real signal can stand out.

Common Features for Inbound and Outbound

Figure 8A:
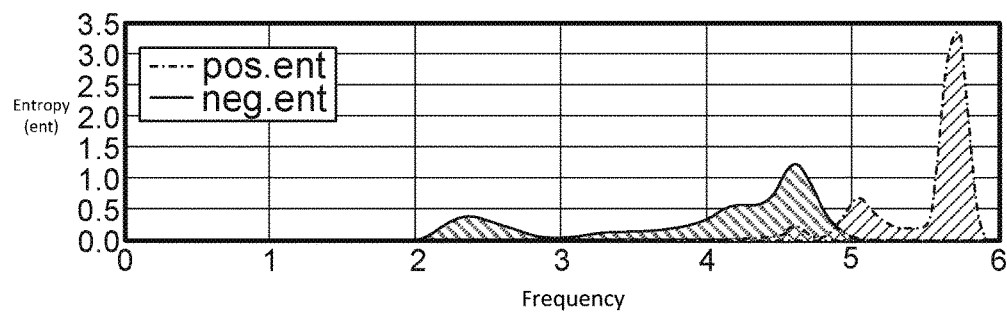
FIGS. 8A-8I are charts that illustrate feature analysis results for inbound traffic in accordance with some embodiments.
Figure 8B:
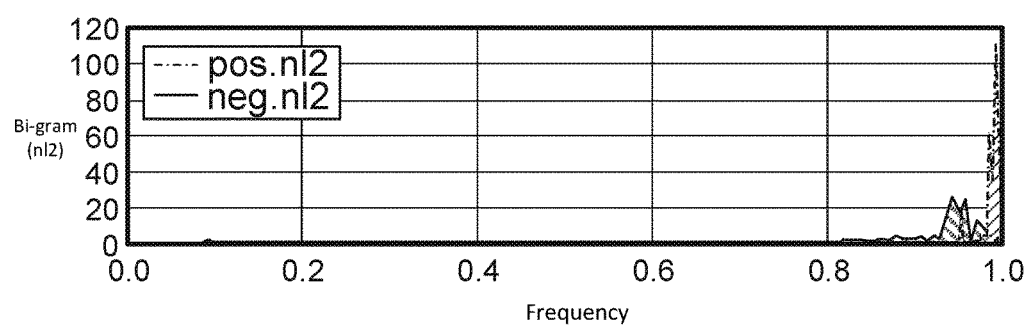
Figure 8C:
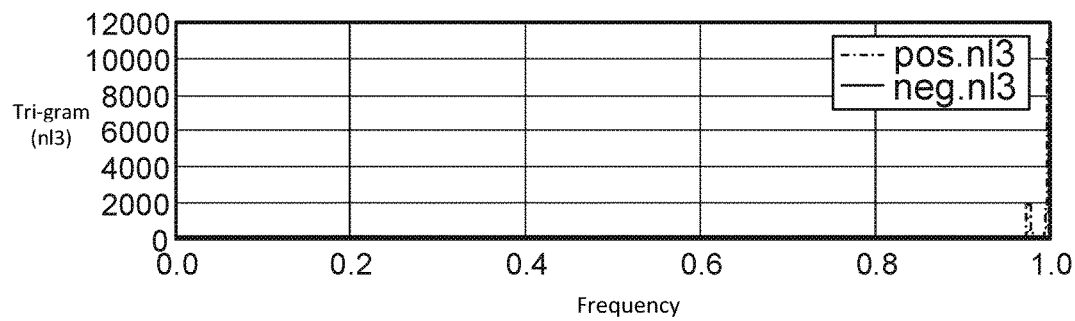
Figure 8D:
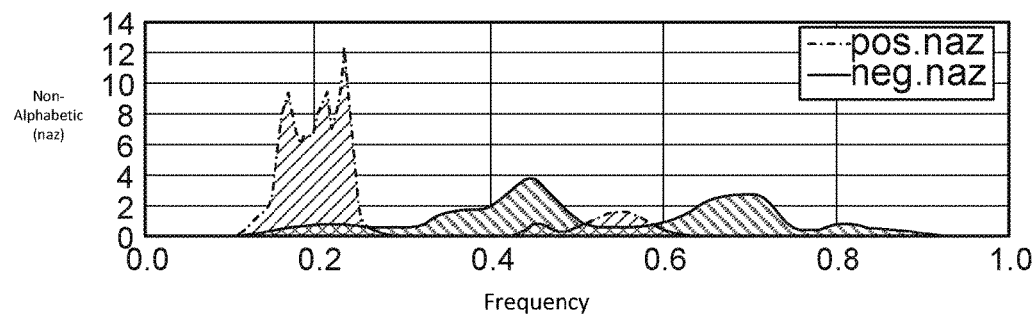
Figure 8E:
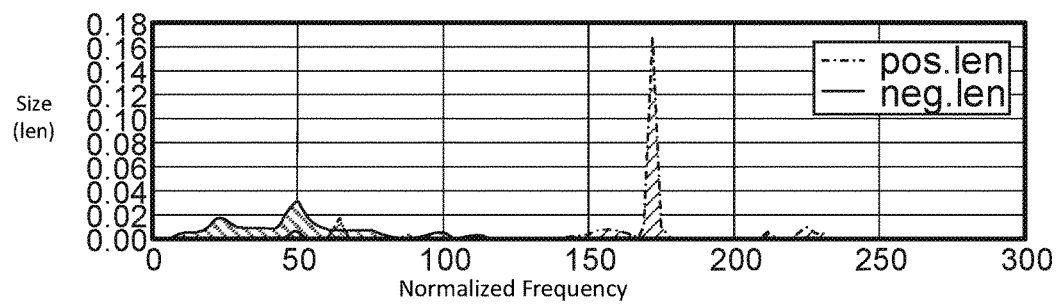
Figure 8F:
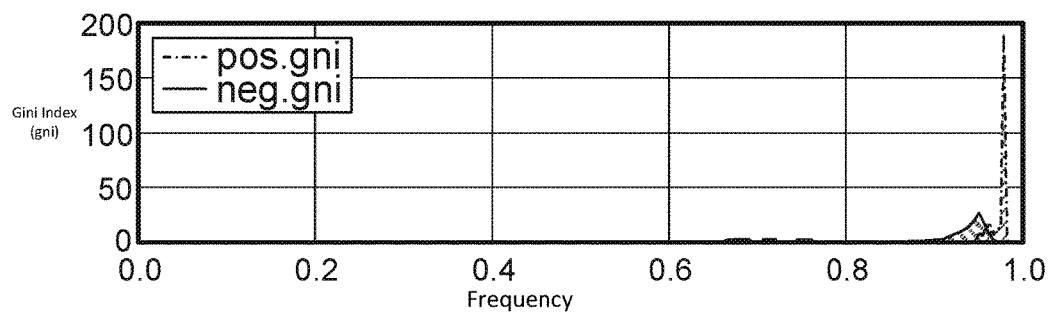
Figure 8G:
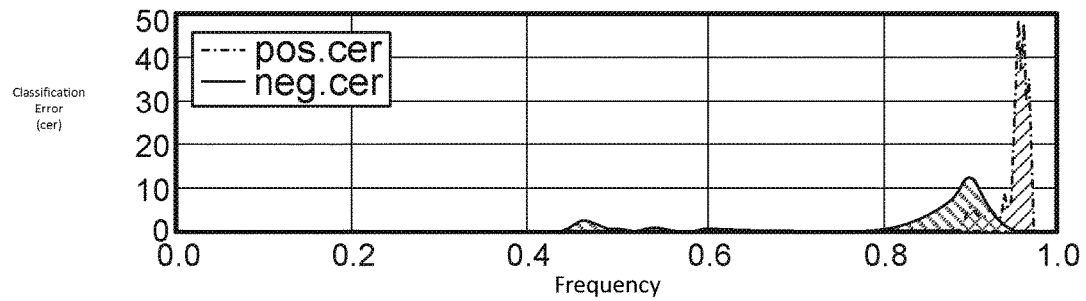
Figure 8H:
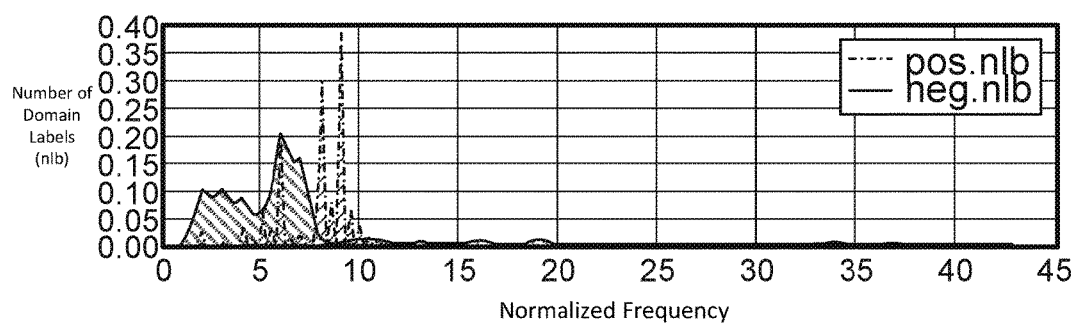
Figure 8I:
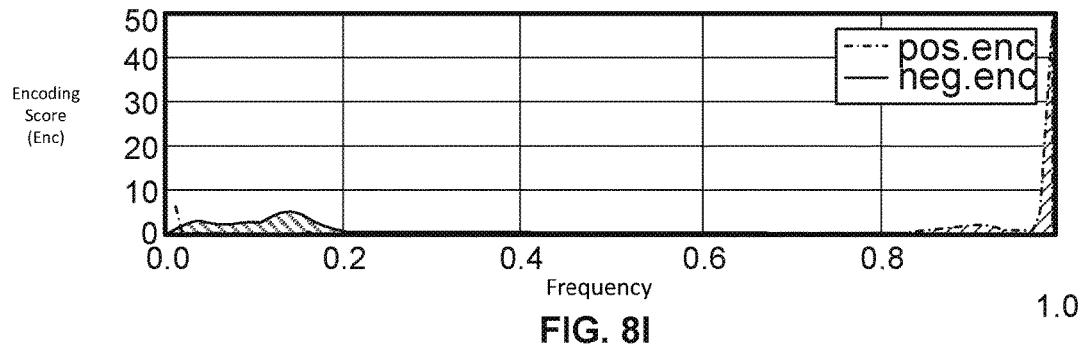

Several payload features common for both inbound and outbound traffics are extracted. FIGS. 8A-8I are charts that illustrate feature analysis results for inbound traffic in accordance with some embodiments (e.g., as example feature analysis distribution results where different curves are shown for positive and negative samples, respectively). Specifically, FIGS. 8A-8I provide the feature analysis results for inbound traffic as follows: FIG. 8A for Entropy; FIG. 8B for Bigram; FIG. 8C for Trigram; FIG. 8D for Lexical feature; FIG. 8E for Payload size; FIG. 8F for Gini index; FIG. 8G for Classification error; FIG. 8H for Number of domain labels; and FIG. 8I for Encoding classification. Their details will now be further described below.

Entropy

According to information theory, entropy is a measurement to quantify the amount of information on a payload. The major objective of a tunnel (e.g., a DNS tunnel) is to convey as much information as possible over a limited payload size. For single payloads, the entropy features are calculated based on the character distribution of the effective payload.

Given the distribution D (x) of a character set {x} within a text string, its entropy is defined as follows:

$ent=\Sigma-D(x)\log D(x)$.

A tunnel is assumed to maximize its bandwidth by increasing the entropy of the data being tunneled.

N-Gram Features

In natural English words, the distributions of N-grams that are not uniform can be used to distinguish them from non-natural English terms. In this example implementation, this feature is defined as the value in the Pth percentile of the N-gram score distribution $f_N(x|S)$ from a text string S, or as follows:

$nl = \int_{-\infty}^{LN} f_N(x|S) dx$.

P can be empirically set to between 40 and 50. For example, in order to generate N-gram scores, a lookup table of N-grams and their frequencies can be generated from a set of N-gram English words Google collected from large amounts of historical publications. In an example implementation based on the experiments, a decision was made to use 2 and 3 grams (e.g., bigrams and trigrams) to have features named nl2 and nl3, respectively.

Lexical Features

In order to pass non-text or binary data, a tunnel tends to use some coding method such as base 64 that introduces many non-human readable characters that can be measured by the lexical features. For a given text string S, the lexical feature is defined as follows:

$$naz = 1 - \frac{|A|}{|S|}, A = \{c \in [a-z], c \in S\}.$$

Payload Size

In this example implementation, there are two features for payload size. One is the size of the effective payload len and the other is the ratio between effective and original payloads reo.

Gini Index

Similar to the entropy feature, Gini index is another way to measure impurity of the data that is defined as follows:

$gni = 1 - \Sigma D^2(x)$.

However, unlike the entropy feature, Gini index is a feature whose value is bounded within a range between zero and one.

Classification Error

In this example implementation, another feature to measure the diversity of a data set is called classification error. Similar to the Gini index feature, the value of this feature is also bounded between zero and one. The definition is as follows:

$cer = 1 - \max\{D(x)\}$.

Number of Labels

In this example implementation, another feature is the number of domain labels in an FQDN payload named as nlb to differentiate legitimate and malicious payloads.

Encoding

In this example implementation, an encoding feature enc is the output of a neural network that takes all of the above features as input. The classifiers are further described below.

Additional Inbound Features

In one embodiment, additional (e.g., including different and/or fewer) inbound features can be utilized for DNS tunneling detection. For example, for inbound messages that come from a DNS response, the TTL of resource records and the response delay can be used as features based on the rationale that most of the legitimate DNS queries tend to have longer TTL for reducing number of queries by caching. On the other side, tunneling DNS messages involves extra processing such as encoding and decoding, encryption and decryption, proxy and so on. That implies longer response time than normal DNS traffic.

Time Series Features

In this example implementation, the time series data is defined by tunnel ID. Since a tunnel is defined by the requester IP address on one end and the SLD on the other end, the tunnel ID is composed of query IP address and SLD. The requester IP address can be a resolver or DNS server IP address and the internal client IP address combined depending on the information availability. The data points are inserted into an observation cache that has a TTL preset to remove old data points from the series. It also has a capacity preset for each series to remove old data points when the number of points hits the capacity though they haven't passed the TTL criterion. This is to guarantee the data freshness and reserve the storage space so that it can be recycled. Applying the payload features on to each of the messages within the time series, a feature set that is denoted as a 2-dimensional matrix is as follows:

$$F=\{f_{i,k}\},$$

where $f_{i,k}$ is the kth feature on the ith message for outbound inbound payloads, respectively. The time series-based behavior features are the basic statistics of individual features on the series that can be denoted as follows:

$$g_k=\text{stat}_i(f_{i,k})$$

where the stat is the collection [count, sum, min, max, avg] to represent the distribution of individual features across the time series. In addition, the entropy on effective inbound and outbound payloads are calculated, respectively, because of the fact that the payload of legitimate traffic doesn't change as much as the malicious ones over the time series.

Classification

In this example implementation, there are two tiers of classification. In the first tier, the classification is targeted on identifying encoded payload while the second tier is for tunnel detection.

Encoding Classification

Figure 9:
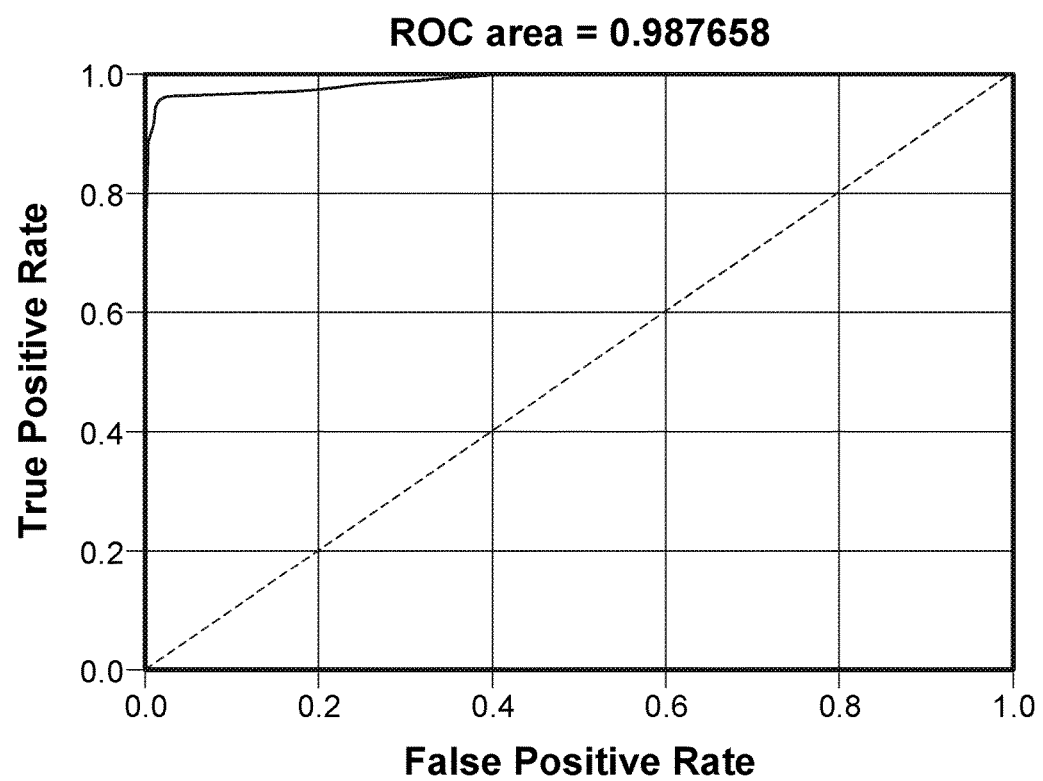
FIG. 9 is the receiver operating characteristic (ROC) curve for an inbound classifier in accordance with some embodiments.

In this example implementation, two neural network classifiers are designed and trained to provide a score indicating if a payload is full of encoded text for inbound and outbound payloads, respectively. For example, each of the classifiers can be trained on large DNS data sets (e.g., millions of samples with truth labeled by security experts and tested on independent sets of samples, respectively). The classifiers have a single hidden layer with four neurons and each uses a logistic activation function defined as follows:

$$\frac{1}{1+e^{-(\sum_{k=1}^{n} f_k w_k + w_o)}}$$

where $f_k$ are inputs, $w_k$ are weights, and $w_o$ is the bias for each neuron. To measure the accuracy of the classifier training, the receiver operating characteristic (ROC) curves are generated on the independent test datasets. FIG. 9 is the ROC curve for an inbound classifier in accordance with some embodiments.

DNS Tunneling Behavior Classification

Among various advanced persistent threats, DNS tunneling is one of the most active and harmful attacks that utilize DNS traffics, therefore, its detection is included in the disclosed online detection system. Various example detection workflows are described below, such as with respect to flow diagrams shown in FIGS. 4, 6, and 7, where the details of the benign detection and fast flux detection modules are also discussed in, for example, FIG. 4.

Figure 2:
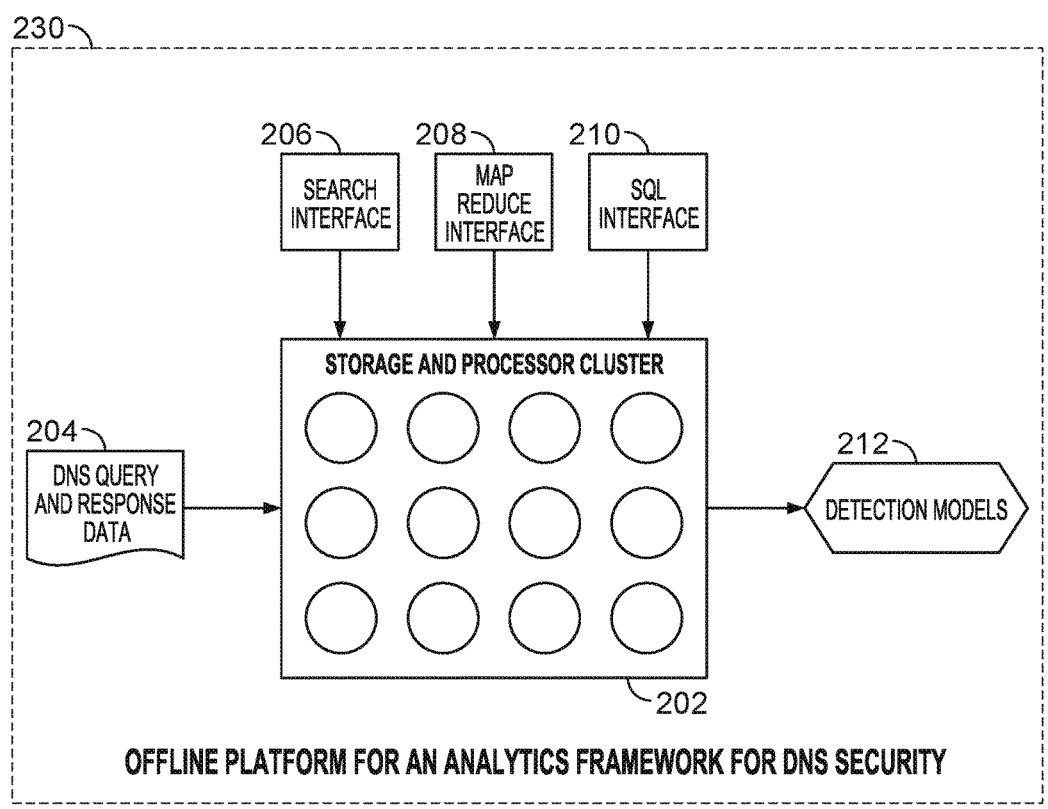
FIG. 2 is a functional block diagram illustrating an architecture for providing an offline platform implementing a behavior analysis based DNS tunneling detection and classification framework for network security in accordance with some embodiments.

As an example use case scenario, a baseline can be provided for the system with an input of an initial DNS data set that is analyzed using the offline analysis platform shown in FIG. 2. In this example, the initial DNS data set can include a set of DNS data collected over a period of time that was collected from one or more sources, such as from Farsight Security's Internet Systems Consortium (ISC)/Security Information Exchange (SIE) with millions or even billions of DNS messages that can be used as the initial DNS data (e.g., such DNS data is collected through ISC/SIE passive DNS technology from more than 80 contributors distributed worldwide). In some cases, the baseline can illustrate a detection accuracy with various defined metrics. Also, the initial DNS data can be analyzed to provide insights about the DNS tunneling activities and behavior(s). In some implementations, the offline platform can be used for offline data analysis and semi-supervised training using various techniques described herein. A MapReduce or Spark job can be created and executed to simulate online detection including feature extraction, time series modeling, and DNS tunneling detection.

For example, using an example initial bulk DNS data set, the following results were shown using the above-described offline platform and techniques. The result shows that, using a collection of nearly nine months of DNS data collected from Farsight from 2012 to 2013 at a rate of 1.8 B/day, a total of 28.8M tunneling transactions of 90 tunnels that were observed by 73 DNS servers over 6 SLDs were detected and manually confirmed (e.g., by network security experts, in which with some simple filtering logics such as DNS type, payload size, series length, and whitelisting, a set of candidates can be extracted and reviewed by security experts for truth labeling, and, for example, about 2000 samples were selected for training and testing a tree classifier that was tuned to minimize the false positive rate). Due to the lack of end user identification, by tunnel, it means a connection between the underlying DNS server and the SLD. A tunneling transaction generally includes a DNS query and a response. Most of the tunnels last through the end of the data collection period with a few lasting for less than a day. The average observation time before detecting a tunnel was 31 days. The results are based on the classification settings that are for a higher precision rate. Therefore, the false positive rate was zero.

In one embodiment, a classifier is provided for each type of DNS traffic. For example, a distinct classifier can be provided for query only without meaningful payload in response, response only without meaningful payload in query, and/or query plus response.

In one embodiment, results of DNS tunneling detection determined one or more new bad domain names that can be included in a reputation feed. For example, a list of bad domain names can be included in a reputation feed (e.g., using a DNS Response Policy Zones (RPZ) feed or another communication mechanism). The list of known bad domain names can be identified by domain name and/or IP address. The list of known bad domain names can be used as a blacklist. As an example, DNS devices can receive an RPZ feed and process DNS data based on the RPZ feed. In this example, if a domain name or IP address is identified as blacklisted in the RPZ feed, then the DNS device can process a request based on the RPZ feed (e.g., do not respond to a query for a domain name or IP address included on the blacklist, etc.). As such, the RPZ feed and/or other communication mechanisms can facilitate broadcast/distribution of the updated bad domain list that is determined using the disclosed techniques for DNS tunneling detection (e.g., and/or similarly applied for domain flux detection, such as further described below).

Example Domain Flux Classification Models

As previously discussed with respect to prior approaches for flux domain detection, the most prominent characteristics that the DNS message of a flux domain may carry include a short TTL value, changing resolved IP addresses, and a large set of resolved IP addresses. However, many flux domain query responses have been observed that have very large TTL values and only one or a small set of resolved IP addresses. In such cases, it is not reliable to decide if a Fully Qualified Domain Name (FQDN) is using a fast flux technique or such a determination cannot be made simply based on each single DNS message.

Accordingly, in one embodiment, a time series model based on a set of features by applying a set of prominent features that can address behavior changes in domain flux is applied, such as using the online platform discussed above. Specifically, the proposed detection mechanism is based on a series of DNS messages associated with the underlying FQDN, as further discussed below.

Let $m^d(t, P)$ be one DNS message for the FQDN d, where t is the TTL value and $$P=\{p\}$$

is the set of resolved IP addresses from the DNS response. A set of consecutive DNS messages $$M^d=\{m^d\}$$

is collected against the FQDN d to determine whether d is a flux domain or not. Therefore, we can define $$U=U_{m \in M} P$$

as the set of unique IP addresses from a set of consecutive messages M.

A flux domain tends to set a lower TTL value so that it will not stay in the DNS cache for a long time. The most obvious feature is the average TTL value $$T=\bar{t} \qquad (1)$$

for the set $M^d$. In addition, malware, such as C&C botnets and/or other malware, often tend to frequently change destinations to different IP addresses. In this example, we focus on IPv4 addresses, and as would be apparent to those of ordinary skill in the art, similar techniques can be applied to IPv6 addresses. The number of unique resolved IP addresses is another feature that is $$N=|U|. \qquad (2)$$

One of the challenges in detecting malicious flux domains is to distinguish many legitimate domains owned by, for example, CDN, load balancer vendors, and NTP providers that are also providing a large number of changing destination IP addresses and short TTL values. These are referred to as legitimate flux users to contrast them with illegitimate flux domain users (e.g., malicious or suspicious flux domain users).

Compared to the malicious flux domain creators that acquire destination IP addresses from compromised systems randomly distributed everywhere and each has a very short lifetime, the resolved IP addresses provided by the legitimate flux users are generally distributed in a limited number of subnets and typically have good shares among the first one, two, and three octets of the IPv4 addresses. As such, we define an entropy feature E on the first two octets of the addresses of the set U. Entropy can provide a useful measure for the uncertainty of a random variable. For a set of elements S, let $D_s$ be the distribution of the unique elements, the entropy of set S is then defined as follows:

$$E_s=1-\Sigma[D_s \log(D_s)], \qquad (3)$$

which has a value between 0 and 1. This principle can also be applied to each DNS message. As a result, this provides the average entropy calculated on the first three octets of the addresses of the set of resolved IP addresses per each DNS message, which is denoted as follows:

$$F=\bar{e}_c. \qquad (4)$$

This provides a good indicator of the target address neighborhood. An additional feature that is analyzed is the one to measure the loyalty of the resolved IP addresses, defined as follows:

$$L = \frac{\Sigma_{m \in M} |P| - |U|}{|M||U| - |U|}. \qquad (5)$$

The L value will be higher if the target IP addresses are frequently reused, and vice versa. For legitimate flux domain users, because the resolved IP addresses come from a reliably managed pool, a destination IP is often reused within a region. On the other side, malicious flux domain users typically want to evade the detection systems and accommodate the availability fluctuation of compromised servers by changing resolved IP addresses frequently. As a result, the loyalty feature can provide prominent attributes that facilitate in lowering the false positive rate of this domain flux classification technique for malicious flux domain detection.

Now that we have defined the above equations as indicated by equation line references (1), (2), (3), (4), and (5), we will now discuss the domain flux classification that can be performed using these equations. After a thorough feature selection process on a large set of training dataset (e.g., performed using an offline platform, such as described below with respect to FIG. 2), we now focus on the feature vector (T, N, E, F, L), based on equations (1), (2), (3), (4), and (5), that will be used to build a time series model in classification of flux domains.

A trivial approach of supervised machine learning is to collect a set of samples with some size and get truth marked by security experts, and then partition the data for training and testing with various machine learning technologies. In the real world of network security, the ratio between the number of malicious messages and number of benign messages in DNS traffic is very small. As such, it is very costly to follow this trivial approach to have experts looking through an extremely large set of samples. On the other side, the traditional unsupervised methods will be less likely to provide good results on this highly biased network dataset. Therefore, a new semi-supervised machine learning technique is disclosed.

In one embodiment, a semi-supervised machine learning technique is provided that uses heuristics-based semi-supervised regression. For example, the heuristics-based semi-supervised regression approach can be applied in defining the classification system for detecting flux domain queries with a high confidence and, on the other side, this approach will not generate obvious false positives. In an example implementation, the regression starts from a relatively small capture rate and the coverage is extended to a degree where obvious false positive results start to be observed (e.g., 1%). In this example implementation, at each step, a security expert(s) will review the difference of the results which constructs the metrics of coverage and recall rates.

Offline Platform Architecture for Implementing an Analytics Framework for DNS Security FIG. 2 is a functional block diagram illustrating an architecture for providing an offline platform implementing a behavior analysis based DNS tunneling detection and classification framework for network security in accordance with some embodiments. For example, the offline platform can be provided to perform various offline forensics of bulk DNS query and response data (e.g., analysis of DNS logs).

As shown in FIG. 2, an architecture of an offline platform 230 is provided for implementing an analytics framework for DNS security (e.g., based on passive DNS traffic analysis). For example, the offline forensic platform can be used to collect DNS data and support machine learning processes that can be used to generate various detection models based on historical DNS data collections. Given a sizable network, the DNS volume is typically very large while the number of anomalous queries is relatively small. In order to capture a sufficient number of samples for the offline forensic platform, it is generally desirable to collect and store a significant amount of historical DNS data with a full set of attributes from DNS queries and DNS responses. The challenge is not only in the effectiveness of cost and performance in such storage, but also in the capacity and flexibility of computational power for processing such a large amount of data in parallel. Accordingly, in some implementations, the offline forensic platform that is disclosed can include Hadoop, HBase, Impala, Hive, Solr and various other Hadoop ecosystems from Apache open source projects. For example, the storage and processor cluster can be built on a multi-node Hadoop system (e.g., a nine-node Hadoop system). The offline forensic platform can provide the characteristics and functionalities that are used for big data advanced analytics through, for example, three types of interfaces, including search, Structured Query Language (SQL), and MapReduce. Because all of the components inherit the properties of scalability and fault tolerance, this system is scalable to accommodate data growth and fault tolerable for high availability. Unlike a typical Relational DataBase Management System (RDBMS), the storage can be schema free to facilitate the data changes and diversity though it supports SQL queries for which schema can be defined in the query time rather than in the storing time. The full set of attributes from DNS query and response can be included in the modeling.

Referring to FIG. 2, DNS query and response data 204 is provided as input to storage and processor cluster 202. For example, the DNS query and response data can be a source of bulk DNS queries, such as from ISC or another DNS data source, such as from the local DNS appliances of an entity's network.

As also shown, storage and processor cluster 202 can include various interfaces, including a search interface 206, which can be implemented using an open source search platform (e.g., Apache Lucene or Apache SOLR), a MapReduce interface 208 (e.g., implemented using Hadoop MapReduce), and a database/SQL Interface 210 (e.g., implemented using Apache Hive or Cloudera Impala), any of which can feed into detection models 212, such as example DNS detection models disclosed herein. In particular, any of these interfaces can be used as interfaces for various machine learning and feature analysis techniques. Example feature analysis techniques include entropy feature extraction, distribution analysis, feature selection, dimension reduction, and various other feature analysis techniques. Example machine learning techniques include k-means clustering, Naïve Bayes classification, logistic regression, classification tree, and various other machine learning techniques (e.g., which can be similarly applied to DNS security detection for flux domain related activities detection and/or DNS tunneling related activities detection as disclosed herein). In some implementations, the offline platform can facilitate this machine learning process and its iterations for improving accuracy.

In an example implementation, the offline platform can be used to develop one or more DNS detection models, such as a DNS tunneling activity detection model and/or a flux domain detection model. For example, DNS detection models can be trained using these machine learning techniques. In some cases, the offline platform can be used to provide new DNS detection models and/or to re-train/modify existing DNS detection models to improve such DNS detection models that can then be provided to the online platform described above with respect to FIG. 1 to apply the new or improved DNS detection models.

In one embodiment, storage and processor cluster 202 is a scalable, parallel computing (e.g., using a set of servers, such as using a computing service such as Amazon Web Services) implementation. Specifically, storage and processor cluster 202 can be implemented using a Hadoop cluster for storing DNS structured query data. More specifically, DNS query and response data can be modeled (e.g., based on standard requirements for DNS protocol, such as Internet Engineering Task Force (IETF) Request for Comments (RFC) requirements for the DNS protocol) in the Hadoop cluster. As a result, structured information can be stored to define attributes based on RFCs that define DNS protocol to optimize the search, query, and MapReduce interface access to provide optimal performance for DNS using various machine learning techniques.

As an example use case scenario, a baseline can be provided for the system with an input of an initial DNS data set that is analyzed using the offline analysis platform shown in FIG. 2. In this example, the initial DNS data set can include a set of DNS data collected over a period of time that was collected from one or more sources, such as from Farsight Security's Internet Systems Consortium (ISC)/Security Information Exchange (SIE) with millions or even billions of DNS messages that can be used as the initial DNS data (e.g., such DNS data is collected through ISC/SIE passive DNS technology from more than 80 contributors distributed worldwide). In some cases, the baseline can illustrate a detection accuracy with various defined metrics. Also, the initial DNS data can be analyzed to provide insights about the fast flux malware and its behavior(s). In some implementations, the offline platform can be used for offline data analysis and semi-supervised training using various techniques described herein. A MapReduce or Spark job can be created and executed to simulate online detection including feature extraction, time series modeling, and flux detection.

For example, using an example initial bulk DNS data set, the following results were shown using the above-described offline platform and techniques. The result shows that, using a collection of 200 days of DNS data, and in this DNS data set example such DNS data was collected from November 2012 to June 2013, there are 10 million DNS messages for 906 unique domains classified as flux domains. Furthermore, these flux domains come from 527 second level domains and the number of unique resolved IPs reaches a half million. In this example, each of the flux domains were manually reviewed and cross checks were performed. Three of the detected flux domains, identified as olendi.com, lodgelocker.com, and loenbun.com, are less popular sites according to the Alexa ranking of web sites. The other five sites, identified as dashjr.org, sipa.be, bluematt.me, litecoinpool.org, and xurious.com, appear to be peer-to-peer seed trackers. Interestingly, the average TTL value of these detected queries can be as high as 14 hours. That means a flux domain can slowly change its target IP address to hide itself from most detection algorithms. On average, 23,892 DNS messages are detected to be of flux domain per day or the rate is 24 every one million messages.

Assuming all flux domains with the same SLD are created by the same attacker, listed below are the top ten Autonomous System (AS) networks by the number of attackers as shown in Table 1.

TABLE 1

Top 10 AS Networks Compromised by Flux Domains

| Number of Flux Domain SLD | Number of Queries | AS Number (ASN) | ASN Name |
|---|---|---|---|
| 489 | 2,109,222 | 701 | UUNET - MCI Communications Services, Inc. d/b/a Verizon Business |
| 475 | 1,151,573 | 20,115 | CHARTER-NET-HKY-NC - Charter Communications |
| 453 | 542,027 | 20,845 | DIGICABLE DIGI Ltd. |
| 452 | 627,966 | 9,121 | TTNET Turk Telekomunikasyon Anonim Sirketi |
| 444 | 710,814 | 6,830 | LGI-UPC Liberty Global Operations B.V. |
| 438 | 922,094 | 812 | ROGERS-CABLE - Rogers Cable Communications Inc. |
| 437 | 509,095 | 33,491 | COMCAST-33491 - Comcast Cable Communications, Inc. |
| 429 | 272,742 | 20,001 | ROADRUNNER-WEST - Time Warner Cable Internet LLC |
| 428 | 418,868 | 10,796 | SCRR-10796 - Time Warner Cable Internet LLC |
| 414 | 303,796 | 7,015 | COMCAST-7015 - Comcast Cable Communications Holdings, Inc |

Figure 4:
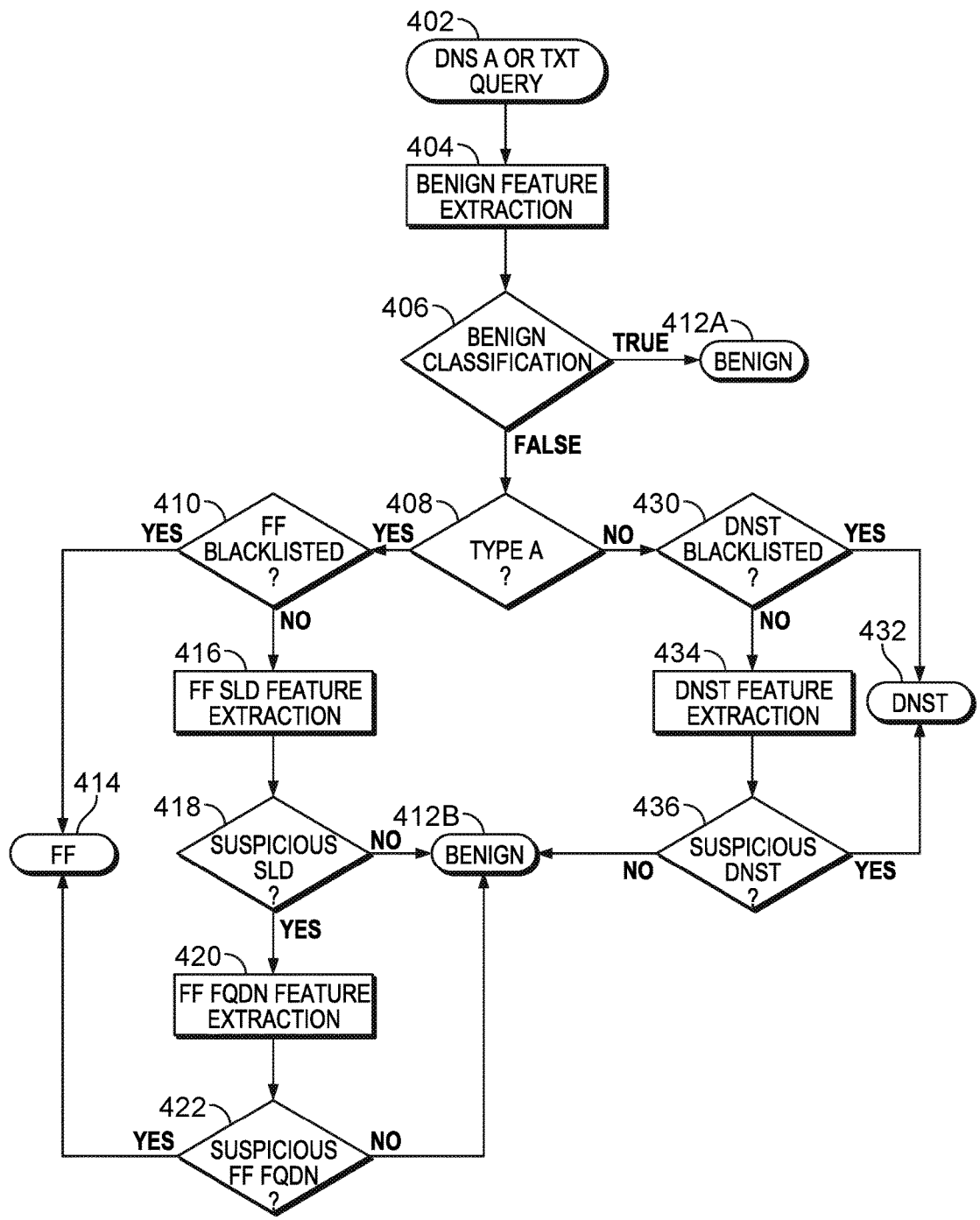
FIG. 4 is a flow diagram for implementing an analytics framework for DNS security that performs behavior analysis of DNS traffic to identify fast flux domain traffic and DNS tunneling traffic in accordance with some embodiments.

Real-Time Detection System for Flux Domain Detection and DNS Tunneling Detection Based on Passive DNS Traffic Analysis FIG. 4 is a flow diagram for implementing an analytics framework for DNS security that performs behavior analysis of DNS traffic to identify fast flux domain traffic and DNS tunneling traffic in accordance with some embodiments.

Referring to FIG. 4, at 402, a DNS query is received for processing and classification. At 404, a benign feature extraction is performed. With the increase of network complexity and the number of devices, it is reasonable to expect a throughput up to, for example, one million DNS messages per second at peak time within a large network. On the other side, the number of unique FQDNs to be requested can be around, for example, 200 million and this number continues to increase. As such, it is desirable for the real-time detection system to be able to process DNS stream data with both volume and velocity. In order to reduce the workload on flux domain detection, a benign classification is performed as a processing stage that can be used to drop DNS messages that are determined to not be malicious with high confidence. For example, the benign classification can be implemented as a whitelist (e.g., a listing of known good network domains).

At 406, if the DNS query is determined to be benign, then the process is completed at 412A with the benign classification for the DNS query. Otherwise, processing proceeds to 408 and then to 410 to determine whether the DNS query is on a fast flux (FF) blacklist (e.g., a listing of known bad network domains that were previously identified/determined to be associated with malicious flux domains). If so, then the process is completed at 414 with the fast flux (FF) classification for the DNS query. Otherwise, processing proceeds to 416 to perform fast flux (FF) Second Level Domain (SLD) feature extraction.

At 418, whether the DNS query is a suspicious FF SLD is determined. If not, then the process is completed at 412B with the benign classification for the DNS query. Otherwise, processing proceeds to 420 to perform fast flux (FF) Fully Qualified Domain Name (FQDN) feature extraction.

At 422, whether the DNS query is a suspicious FF FQDN is determined. If not, then the process is completed at 412B with the benign classification for the DNS query. If so, then the process is completed at 414 with the fast flux (FF) classification for the DNS query.

In an example implementation, a component of the benign classifier is a whitelist of, for example, 80 items that are carefully selected from the top 100 second level domains or SLDs.

In addition, queries $$\{m^d(t,P):t>86400 \text{ or } |P|>1 \text{ and } E_p 21\ 0.5\}.$$

where Ep is the entropy that is calculated on the first two octets of the resolved IP address set P, can be classified as benign with confidence. However, when a DNS message is classified as not a fast flux (FF) domain, that does not mean that the underlying FQDN d is benign. Rather, the underlying FQDN will be classified further when the time series is updated by the new messages (e.g., DNS stream data associated with that FQDN).

Referring to FIG. 4, at 430, whether the DNS query is on a DNS Tunneling (DNST) blacklist (e.g., a listing of known bad network domains that were previously identified/determined to be associated with unauthorized/malicious DNS tunneling activity) is determined. If so, then the process is completed at 432 with the DNS Tunneling (DNST) classification for the DNS query. Otherwise, processing proceeds to 434 to perform DNS Tunneling (DNST) feature extraction. The extracted DNST features are analyzed at 436 to detect and classify DNS tunneling activity (if any) (e.g., using the disclosed feature extraction and analysis techniques for DNST detection). As shown, at 436, whether the DNS query is a suspicious DNS tunneling activity is determined. If not, then the process is completed at 412B with the benign classification for the DNS query. If so, then the process is completed at 432 with the DNST classification for the DNS query.

Asynchronous Detection Mode for the Online Platform

Figure 5:
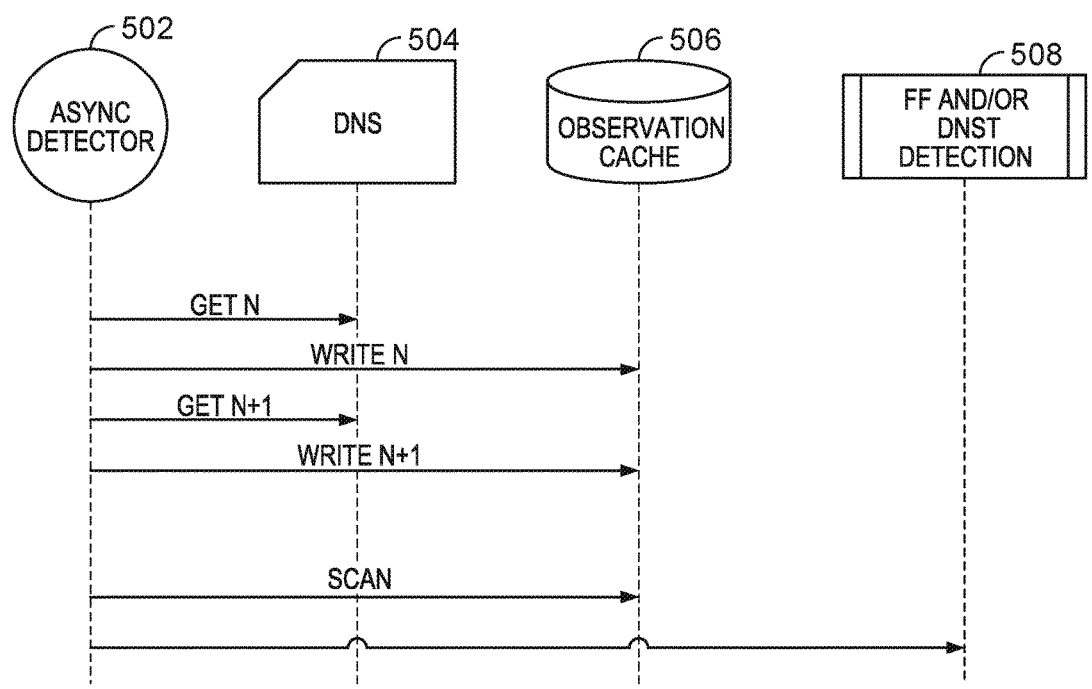
FIG. 5 is a transaction diagram illustrating an asynchronous detection mode for the online platform for DNS security based on passive DNS traffic analysis in accordance with some embodiments.

FIG. 5 is a transaction diagram illustrating an asynchronous detection mode for the online platform for DNS security based on passive DNS traffic analysis in accordance with some embodiments. For example, the exemplary transaction process shown in FIG. 5 can be performed using the online platform discussed above with respect to FIG. 1.

In particular, given the large throughput of DNS traffic, to be cost effective, an asynchronous detection mode for the online platform is provided. In an example implementation, HBase is used to provide a key-value store that is built based on Google's BigTable publication, which is designed to have near in-memory insertion speed. Similar to most database architectures, its random read speed is slower than its write speed. The system resource requirement is generally linearly proportional to the data velocity. In a synchronous detection mode, a detection process on a subject FQDN that includes time series data retrieval, feature extraction, and classification will be triggered whenever there is an update by a new DNS message. To some extent, the synchronous detection mode will hit the disk input/output (I/O) bound given a limited hardware resource. To overcome this problem, online detection is performed in an asynchronous mode to avoid frequent random reads. Therefore, the detection can be done in batch mode by scanning with a MapReduce job that is scheduled for, for example, every ten minutes. The process is illustrated in FIG. 5 as further discussed below.

Referring to FIG. 5, at 502, an async detector detects when a DNS message is received from a DNS data source 504. For example, the DNS stream can be DNS messages that are received from DNS appliances that execute an agent to provide such DNS stream data to the online platform. As shown, for each new DNS message, a Get N operation is performed and a Write N operation is performed. The write operation is performed to write the DNS message to the observation cache 506, which can be used to collect time series DNS data as discussed above with respect to, for example, FIG. 1. As each new DNS message is received, another Get N+1 operation and Write N+1 operation are performed, respectively. A scan operation and fast flux (FF) and/or DNS tunneling (DNST) detection can be performed as shown at 508, such as similarly described above and further described below.

Online Detection Performance

In an example implementation, the DNS tunneling classifiers that were trained in the above-described offline system can be deployed in an online real-time detection system that is designated to deal with fast and large streaming data. As an example, in an enterprise deployment, the throughput can be provided at approximately 1-3 million DNS queries per second. As another example, the throughput can reach a billion per second in a cloud-based deployment. Therefore, the horizontal scalability is an important design factor that facilitates high-throughput as disclosed herein.

As an example, performance benchmarking can be executed on a cluster of nine systems in which each is equipped with, in this example implementation, a CPU of 2.9 GHz and four cores, 16 GB memory, and two 1 TB hard disks. The cluster can be linked with a 1 Gbps network and can be loaded with CentOS 6.4, Hadoop 2.0, HBase 0.94, Storm 0.8, and Kafka 0.7. In this example implementation, the cluster can reach a throughput of processing up to 2.8 million DNS messages per second. As would be apparent to one of ordinary skill in the art, this performance can be further tuned and optimized using different hardware/software combinations and/or additional hardware for processing.

Example DNS Tunneling Detection Process Embodiments

Figure 6:
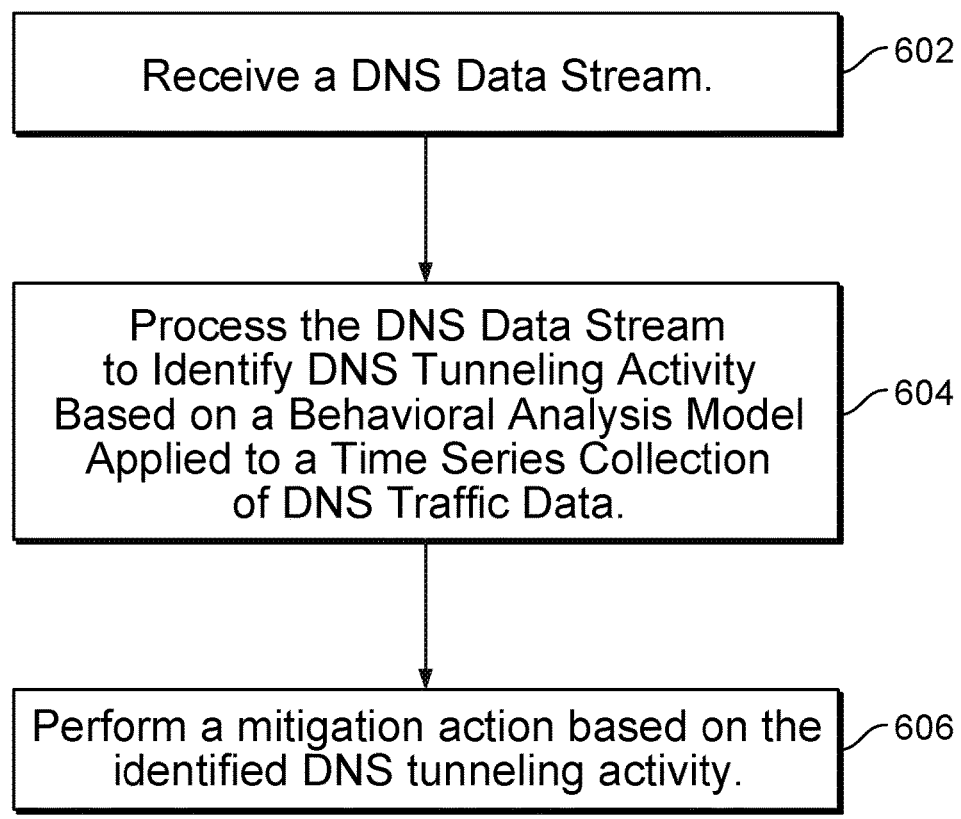
FIG. 6 is a flow diagram illustrating a process for providing a platform implementing a behavior analysis based DNS tunneling detection and classification framework for network security in accordance with some embodiments.

FIG. 6 is a flow diagram illustrating a process for providing a platform implementing a behavior analysis based DNS tunneling detection and classification framework for network security in accordance with some embodiments.

At 602, a DNS data stream is received. For example, the DNS data stream can include DNS query and DNS response data and/or other DNS related data.

At 604, the DNS data stream is processed to identify DNS tunneling activity (e.g., DNS tunneling behavior) based on a behavioral analysis model (e.g., a classifier) applied to a time series collection of passive DNS traffic data. For example, various techniques are disclosed for implementing a behavior analysis based DNS tunneling detection and classification framework for network security.

At 606, a mitigation action based on the identified DNS tunneling activity (e.g., DNS tunneling behavior) is performed. For example, the mitigation action can include a configuration action and/or a filtering action (e.g., block or drop packets to/from the bad/malware network domain and/or bad/malware IP address associated with the DNS tunneling activity). As another example, a bad/malware network domain/FQDN and/or malware IP associated with the suspicious/malicious DNS tunneling activity can be identified and added to a blacklist/policy, which can be communicated/distributed such as using a reputation feed (e.g., RPZ feed) or another communication mechanism.

Figure 7:
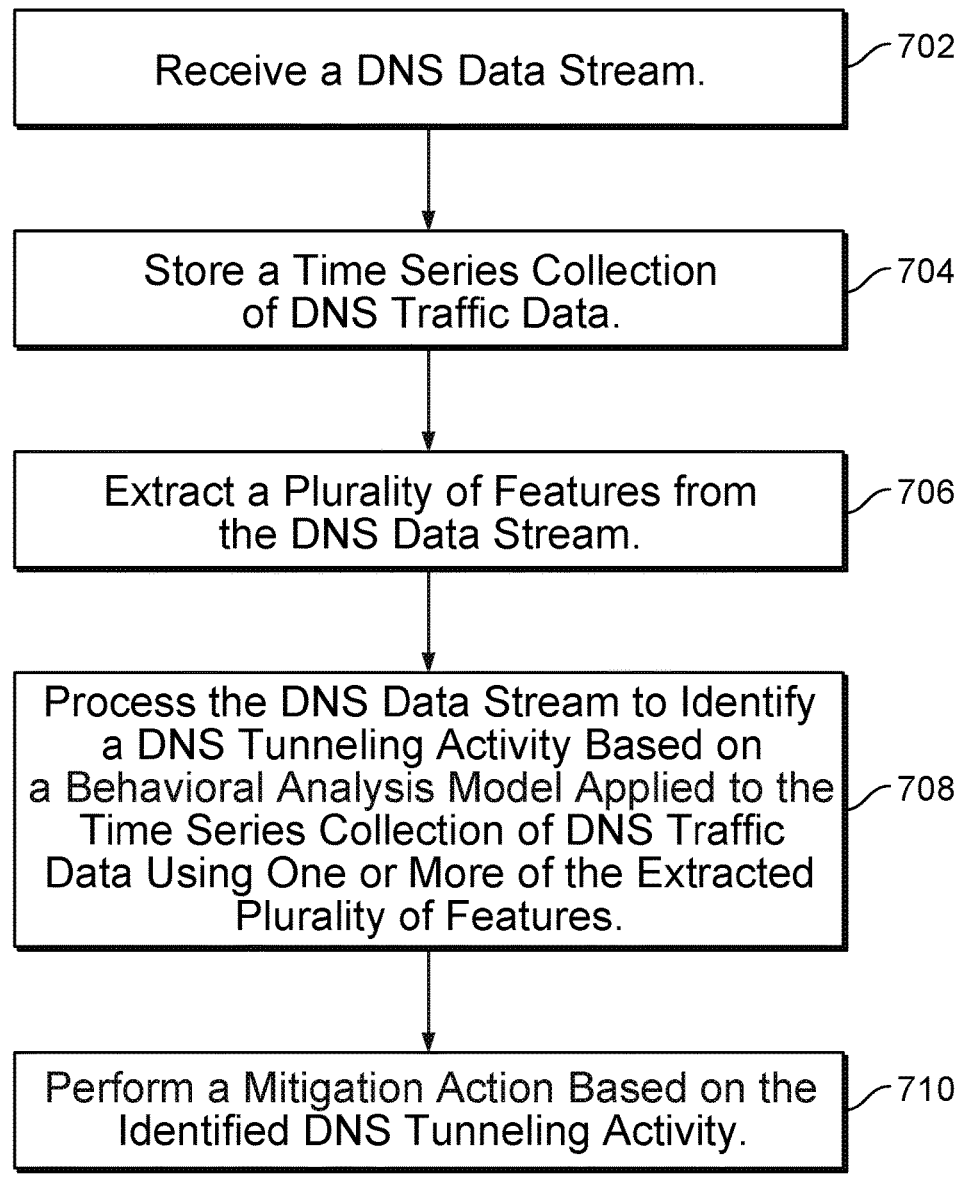
FIG. 7 is another flow diagram illustrating a process for providing a platform implementing a behavior analysis based DNS tunneling detection and classification framework for network security in accordance with some embodiments.

FIG. 7 is another flow diagram illustrating a process for providing a platform implementing a behavior analysis based DNS tunneling detection and classification framework for network security in accordance with some embodiments.

At 702, a DNS data stream is received. For example, the DNS data stream can include DNS query and DNS response data and/or other DNS related data.

At 704, a time series collection of passive DNS traffic data is stored. For example, the time series collection of passive DNS traffic data can be stored in an observation cache. In some implementations, a threshold number of instances of DNS queries with respect to a particular network domain received within a predetermined period of time is used as a trigger for performing further DNS tunneling analysis (e.g., of that particular DNS domain based on extracted features).

At 706, a plurality of features is extracted from the DNS data stream. For example, one or more features, such as source IP address, source host, network domain name (e.g., SLD and/or FQDN), TTL value, and/or other features, can be extracted from the DNS data stream.

At 708, the DNS data stream is processed to identify DNS tunneling activity (e.g., DNS tunneling behavior) based on a behavioral analysis model (e.g., a classifier) applied to a time series collection of DNS traffic data using the one or more of the extracted plurality of features. For example, various techniques are disclosed for implementing a behavior analysis based DNS tunneling detection and classification framework for network security.

At 710, a mitigation action based on the identified DNS tunneling activity (e.g., DNS tunneling behavior) is performed. For example, the mitigation action can include a configuration action and/or a filtering action (e.g., block or drop packets to/from the bad/malware network domain and/or bad/malware IP address associated with the DNS tunneling activity). As another example, the mitigation action can include configuring a network device (e.g., a switch or router, implemented as a physical or virtual switch/router) to quarantine the infected host and/or block access to the bad network domain and/or bad IP address associated with DNS tunneling activity, using network access control or other mechanisms to quarantine the infected host and/or block access to the bad network domain and/or bad IP address, configuring a security device controller using Open Flow techniques to configure a network device (e.g., a switch or router, implemented as a physical or virtual switch/router) to quarantine the infected host and/or block access to the bad network domain and/or bad IP address, and/or to implement other configuration/programming techniques such as via API or publish/subscribe mechanisms to configure a network device (e.g., a switch or router, implemented as a physical or virtual switch/router) to quarantine the infected host and/or block access to the bad network domain and/or bad IP address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an online platform for implementing a behavior analysis based DNS tunneling detection and classification framework for network security, comprising:
 a processor configured to:
  receive a Domain Name Server (DNS) data stream;
  process the DNS data stream to identify DNS tunneling activity based on a behavioral analysis model applied to a time series collection of passive DNS traffic data, comprising to:
   perform the following DNS feature extractions to be input into the behavioral analysis model:
    perform at least one of the following:
     determine entropy of a text string in the DNS data stream based on a distribution of a character set within the text; string; or
     determine a lexical feature based on human readable characters and non-human readable characters within a text string, wherein the human readable characters include alphabet characters; and
    determine a value in a percentile of an N-gram score distribution from a text string in the DNS data stream, wherein the percentile is determined based on a character set within a text string, and wherein N is an integer greater than or equal to 2; and
   perform a mitigation action based on the identified DNS tunneling activity; and
 a memory coupled to the processor and configured to provide the processor with instructions.

2. The system recited in claim 1, wherein the DNS data stream includes DNS query and DNS response data.

3. The system recited in claim 1, wherein a network domain is determined to be a bad network domain based on an association with the identified DNS tunneling activity, and wherein the bad network domain is associated with a Fully Qualified Domain Name (FQDN).

4. The system recited in claim 1, wherein a network domain is determined to be a bad network domain based on an association with the identified DNS tunneling activity, and wherein the processor is further configured to:
 determine a host is infected based on detecting a DNS query request to the bad network domain from the host.

5. The system recited in claim 1, wherein a network domain is determined to be a bad network domain based on an association with the identified DNS tunneling activity, and wherein the processor is further configured to:
 determine a host is infected based on detecting a DNS query request to the bad network domain from the host; and
 perform another mitigation action based on the determined infected host.

6. The system recited in claim 1, wherein a network domain is determined to be a bad network domain based on an association with the identified DNS tunneling activity, and wherein the mitigation action includes one or more of the following:
 generate a firewall rule based on the bad network domain;
 configure a network device to block network communications with the bad network domain;
 quarantine an infected host, wherein the infected host is determined to be infected based on an association with the bad network domain; and
 add the bad network domain to a reputation feed.

7. The system recited in claim 1, wherein a network domain is determined to be a bad network domain based on an association with the identified DNS tunneling activity, and wherein the processor is further configured to:
 identify a source IP address, a source host, or an attempt to query the bad network domain.

8. The system recited in claim 1, wherein the processor is further configured to:
 store the time series collection of passive DNS traffic data in an observation cache.

9. The system recited in claim 1, wherein the processor is further configured to:
 receive DNS data that is collected from an agent executed on a DNS appliance.

10. The system recited in claim 1, wherein the processor is further configured to:
 extract a plurality of features from the DNS data stream to detect DNS tunneling based on the extracted plurality of features.

11. A method of an online platform for implementing a behavior analysis based DNS tunneling detection and classification framework for network security, comprising:
 receiving a Domain Name Server (DNS) data stream;
 processing the DNS data stream using a processor to identify DNS tunneling activity based on a behavioral analysis model applied to a time series collection of passive DNS traffic data, comprising:
  performing the following DNS feature extractions to be input into the behavioral analysis model:
   performing at least one of the following:
    determining entropy of a text string in the DNS data stream based on a distribution of a character set within the text string; or
    determining a lexical feature based on human readable characters and non-human readable characters within a text string, wherein the human readable characters include alphabet characters; and
   determining a value in a percentile of an N-gram score distribution from a text string in the DNS data stream, wherein the percentile is determined based on a character set within a text string, and wherein N is an integer greater than or equal to 2; and
  performing a mitigation action based on the identified DNS tunneling activity.

12. The method of claim 11, wherein the DNS data stream includes DNS query and DNS response data.

13. The method of claim 11, wherein a network domain is determined to be a bad network domain based on an association with the identified DNS tunneling activity, and wherein the bad network domain is associated with a Fully Qualified Domain Name (FQDN).

14. The method of claim 11, wherein a network domain is determined to be a bad network domain based on an association with the identified DNS tunneling activity, and further comprising:
 determining a host is infected based on detecting a DNS query request to the bad network domain from the host.

15. The method of claim 11, wherein a network domain is determined to be a bad network domain based on an association with the identified DNS tunneling activity, and further comprising:
 determining a host is infected based on detecting a DNS query request to the bad network domain from the host; and
 performing another mitigation action based on the determined infected host.

16. A computer program product for an online platform for implementing a behavior analysis based DNS tunneling detection and classification framework for network security, the computer program product being embodied in a tangible non-transitory computer readable storage medium and comprising computer instructions for:
    receiving a Domain Name Server (DNS) data stream;
    processing the DNS data stream to identify DNS tunneling activity based on a behavioral analysis model applied to a time series collection of passive DNS traffic data, comprising:
        performing the following DNS feature extractions to be input into the behavioral analysis model:
            performing at least one of the following:
                determining entropy of a text string in the DNS data stream based on a distribution of a character set within the text string; or
                determining a lexical feature based on human readable characters and non-human readable characters within a text string, wherein the human readable characters include alphabet characters; and
            determining a value in a percentile of an N-gram score distribution from a text string in the DNS data stream, wherein the percentile is determined based on a character set within a text string, wherein the N-gram score distribution is determined based on historical publications, and wherein N is an integer greater than or equal to 2; and
    performing a mitigation action based on the identified DNS tunneling activity.

17. The computer program product recited in claim 16, wherein the DNS data stream includes DNS query and DNS response data.

18. The computer program product recited in claim 16, wherein a network domain is determined to be a bad network domain based on an association with the identified DNS tunneling activity, and wherein the bad network domain is associated with a Fully Qualified Domain Name (FQDN).

19. The computer program product recited in claim 16, wherein a network domain is determined to be a bad network domain based on an association with the identified DNS tunneling activity, and further comprising computer instructions for:
    determining a host is infected based on detecting a DNS query request to the bad network domain from the host.

20. The computer program product recited in claim 16, wherein a network domain is determined to be a bad network domain based on an association with the identified DNS tunneling activity, and further comprising computer instructions for:
    determining a host is infected based on detecting a DNS query request to the bad network domain from the host; and
    performing another mitigation action based on the determined infected host.

* * * * *